United States Patent Office 3,297,452
Patented Jan. 10, 1967

3,297,452
SILICONE POLYMER CHEWING COMPOSITION
James C. Wing, New York, and Arthur Price, Great Neck, N.Y., assignors to James C. Wing, New York, N.Y., and Arthur Price, Great Neck, N.Y., trustees
No Drawing. Filed Nov. 20, 1963, Ser. No. 325,158
3 Claims. (Cl. 99—135)

This invention relates to compositions useful for maintaining and improving oral hygiene. More particularly this invention relates to chewable elastomeric compositions based on silicone polymers.

Complete oral hygiene requires a number of therapeutic and preventative measures many of which are difficult to practice regularly because of the lack of time or facilities required for such practice. Most familiar is the lack of facilities for brushing teeth after a meal away from home. However, other aspects of dental care such as gum massaging and stimulation of the periodontium are important in oral hygiene. Furthermore, it is advantageous to exercise jaw muscles and other face muscles from time to time. In the case of people recovering from surgery or paralysis, it is often necessary to rehabilitate the jaw muscles and restore normal eating habits. Such rehabilitation is best accomplished by use of chewing compositions of the present invention.

Various compositions have been utilized in the prior art in an attempt to meet the requirements of one or more of the various oral hygiene requirements. Thus antibacterial compositions, material containing deodorizing chemicals, and compounds containing abrasives have all been known to the prior art. Most of these have been chicle-based materials not differing substantially from other chewing gums. However, none of these chewing gums were useful for long periods of time because they tended to become too hard on continued mastication because of loss of softening agents or they became too soft because of the temperature at which they were worked. Furthermore, aging problems in such chewing gums required special additives for obtaining satisfactory shelf life.

Therefore it is an object of this invention to provide a chewing composition comprising resilient polymers and which is useful in maintaining oral hygiene. It is also an object of this invention to provide a chewing composition which cleans teeth. It is another object of the invention to provide a chewing composition having long-lasting bactericidal properties but which is itself non-susceptible to harboring bacterial growth. It is a further object of the invention to provide a composition of unique physical properties which is useful in rehabilitating or exercising jaw and other face muscles. It is another object of the invention to provide a chewing composition relatively insensitive to temperature and time. A further object is to provide a chewing composition which has little or no tendency to stick to objects. Another object of the invention is to provide a chewing composition having an improved shelf life. Still another object of the invention is to provide a flexible anesthetic composition that may be applied at very low temperatures to cause the freezing of specific areas.

These objects have been substantially achieved by incorporating certain polymeric silicone compounds as elastomer based chewing compositions. In addition to silicones, these compositions may also comprise flavoring agents for providing pleasant flavor and concealing less agreeable tastes which may be contributed by one or another ingredient of the composition, dentifrices such as abrasives for teeth cleaning and stain removal, and germicides for killing bacteria and eliminating odor. These chewing compositions have also been found to be highly effective in reducing tartar, eliminating debris between teeth and stimulating the periodontium.

Silicone polymers are especially notable for their release properties and low temperature flexibility. Both of these properties are important in chewing compositions; the former avoids the problems associated with ordinary chewing gum because of their notoriously sticky character; the latter avoids brittleness of gums at low temperature. The low temperature brittle point is sufficiently low that anesthetic effects may be obtained in very local areas by application of the flexible gum at very low temperatures.

The silicone polymers that are useful for the present invention are bacteriostatic and of varying molecular configuration and physical properties. Silicone chewing compositions are particularly advantageous because of their long shelf life without hardening. These compounds may be best described by their physical properties, although it is to be understood that no polymers containing leachable toxic materials can be used in the present compositions.

Optimum physical properties of the silicone polymers vary depending upon the exact purpose for which the composition is to be used. For example, a polymer having a relatively low tensile and relatively low tear strength is often preferred for a person just starting to rehabilitate jaw muscles. A person having partly rehabilitated muscles would preferably use a tougher composition. Resiliency is desirable for cleansing teeth and massaging of gums. The properties of the compositions of this invention are present without "breaking in" by initial chewing and biting action; thus, no excessive force is required to commence chewing the composition.

In general the polymers most often used in compositions of the present invention are commercially available materials having the following range of physical properties commonly used to determine the properties of elastomers:

Tensile strength _____ p.s.i__ 150 to 2000
Tear strength _____ lbs__ 20 to 200
Elongation _____ percent__ 50 to 700

Resiliency is measured by the Mooney plastometer method (see ASTM D 927–57T). Optimum Mooney number of the silicone rubber is 14 for a four-minute test at 190° C. However, as those skilled in the art will recognize, polymers of the aforementioned range of physical properties will have Mooney numbers of a considerable range.

These silicone resins are miscible in xylene, toluene, heptane, and the like and soluble in xylene and the lower alcohols and ketones such as isopropyl alcohol and acetone. The brittle point of these polymers is about −190° F.; they melt at about 300° F.

Flavoring agents known to the art are useful in the compositions disclosed herein. Such agents as syrup aurente, syrup wild cherry, syrup tolu, oleum eucalyptol, oleum cloves, oleum spearmint, oleum peppermint, oleum cinnamon have all been incorporated into silicone-polymer compositions successfully. Oleum cinnamon is of particular effectiveness as a flavoring and taste-masking agent. These agents are usually incorporated in the products of the present invention in quantities from 0.5 to 10% by weight.

Among the abrasive agents useful are talcum, bentonite, chalk, pumice which is very finely divided and known as "flour of pumice," and corn starch. Flour of pumice is the preferred abrasive material. These abrasives are usually incorporated in the products of the present invention in quantities of from 5 to 20% by weight.

Germicides which are advantageously incorporated into the compositions of the present invention include commercially available materials. It is particularly advantageous to use sodium hexametaphosphate, which also acts as an emulsifier in the compounding action. These germicides are normally incorporated into the products of the present invention in quantities of from 0.5 to 5%.

It is to be understood that the various compounds classified as polymers, germicides, abrasives, and flavoring agents enumerated herein may be used alone or in mixture with other compounds from the same class.

In order to point out more fully the nature of the present invention, the following specific examples are given as illustrative embodiments of the present invention and products produced thereby.

*Example 1*

A quantity of 9.5 lbs. of talcum powder is charged into a ribbon blender. Added to the blender are 0.5 lb. of a commercially available germicide, 1.5 lbs. of sodium hexametaphosphate and 3.5 lbs. of oleum cinnamon. These materials are blended for fifteen minutes.

While the blending operation proceeds, 85 lbs. of a commercially available silicone polymer having the tensile strength, tear strength, and elongation earlier described herein is placed on a rubber milling machine the rolls of which are mechanically grained and preheated to 100° F. This elastomer is milled for about four minutes after which the dryblend comprising the talcum is slowly added to the elastomeric composition on the milling machine over a fifteen-minute period. After completion of the addition, the material is mixed on the rolls for about ten minutes or until the distribution of the dry blended materials throughout the silicone polymer is substantially uniform.

The uniform mixture is then stripped from the rolls and formed into boles of about one-half inch diameter.

*Example 2*

A quantity of 15 lbs. of flour of pumice is charged into a ribbon blender. Added to the blender at 30-second intervals are 3 lbs. of oleum spearmint and 2 lbs. of a commercially available germicide. These materials are blended for ten minutes after the final material is added.

While the blending operation is proceeding, 80 pounds of a silicone polymer blend having the tensile strength, tear strength, and elongation earlier described herein are prepared from commercially available materials in a Banbury mixer equipped with cooling coils to keep the temperature below 130° F.

The dry blended materials are added to the Banbury mixer and mixed with the elastomers for about three minutes after which the composition is dropped onto a rubber milling machine from which it is stripped off and fed into an extruding machine maintained at about 100° F. from which the material is extruded in the form of one-half inch diameter rod which is cut upon coming out of the extruder into pieces of about one-half inch length.

It is of course to be understood that the foregoing examples are intended to be illustrative and that numerous changes can be made in the reactants, proportions, and conditions set forth therein without departing from the spirit of the invention as defined in the appended claims. This is especially true inasmuch as a number of therapeutic and beneficial actions may be derived from the compositions which contain all of the suggested classes of ingredients. If however, some of these benefits, for example as the cleansing action of the abrasive agents are not required, that agents may be omitted from the composition. In such a case, the benefits derived from the silicone elastomer and the remaining additives will not be adversely affected.

We claim:

1. An elastomeric chewing composition consisting essentially of an effective amount of a flavoring agent in combination with a non-toxic elastomeric solid silicone polymer having a tensile strength of 150 to 2000 pounds per square inch, a tear strength of 20 to 200 pounds, and an elongation of 50 to 700 percent, said polymer having a brittle point at about $-190°$ F. and a melting point at about 300° F.

2. An elastomeric chewing composition consisting essentially of an effective amount of a germicide in combination with a non-toxic elastomeric solid silicone polymer having a tensile strength of 150 to 2000 pounds per square inch, a tear strength of 20 to 200 pounds, and an elongation of 50 to 700 percent, said polymer having a brittle point at about $-190°$ F. and a melting point at about 300° F.

3. An elastomeric chewing composition consisting essentially of a non-toxic solid silicone polymer having a tensile strength of 150 to 2000 pounds per square inch, a tear strength of 20 to 200 pounds, and an elongation of 50 to 700 percent, said polymer having a brittle point at about $-190°$ F. and a melting point at about 300° F., in combination with from 5 to 20 percent by weight of an abrasive compound.

References Cited by the Examiner

UNITED STATES PATENTS

| | | | |
|---|---|---|---|
| 1,396,641 | 11/1921 | King et al. | 99—135 X |
| 2,525,072 | 10/1950 | Kearby | 99—135 X |
| 2,723,217 | 11/1955 | Gershon et al. | 167—93 |
| 2,761,782 | 9/1956 | Leonard | 99—135 |

A. LOUIS MONACELL, *Primary Examiner.*

RAYMOND N. JONES, *Examiner.*

S. E. HEYMAN, *Assistant Examiner.*